2,806,795

METHOD OF PRESERVING FLESHY COMESTIBLES AND PRODUCT

Robert S. Iki, Silver Spring, Md., assignor of one-third to Charles A. Ragan, Chevy Chase, and one-third to John G. Liebert, Bethesda, Md.

No Drawing. Application January 19, 1956, Serial No. 560,066

4 Claims. (Cl. 99—194)

The present invention is concerned with the preparation, preservation and marketing of such fleshy comestibles as fish, shell fish, animal meat, and fowl and relates both to an improved method of processing such comestibles and to an improved processed comestible.

Although the South Atlantic and Gulf Coast furnish between 250,000,000 and 300,000,000 pounds of fish and shell fish annually for distribution as fresh, frozen, canned, salted or smoked products, most of the fish landed at the southern ports enters the fresh fish market. Despite the recent introduction here and there of modern processing methods of preparing fillets, steaks and tenderloins, the most prevalent custom at these southern ports is to ship the fish in the round, that is, without preliminary dressing. Shipping in the round not only entails higher freight charges because of the weight of the head, tail, fins, entrails, etc., but also requires considerably more refrigeration and refrigeration space than is required for shipping the dressed, quick frozen fish. Also, shipping in the round causes some loss in the value of the organs of certain fish, such as the liver, used for valuable by-products. These factors make it difficult for the southern States to compete with New England as a fresh fish center, for in that area much of the catch is routinely processed in modern plants which turn out a conveniently handled product, neatly packaged and quick frozen.

One alternative for handling the catches in the South is by canning. However, at present, the necessary shore facilities for canning fish are limited in the South. For example, extremely heavy catches of mullet and Spanish mackerel are made in a short period of time so that in practice it has often proved impossible for the canneries to handle all of the fish that are caught and not sold locally as fresh fish. This problem could be solved if an economically feasible means were available to hold the fish in suitable frozen form and depending on market demands, distribute it as a frozen product or hold it for canning at the time the cannery becomes available.

The Japanese fishing fleet exepriences difficulties similar to our southern fishing fleet. Although there are many canneries in Japan, there is only a limited amount of tinplate available. As a result of this shortage of tinplate and other factors, the Japanese ship a considerable amount of their fish to the United States in the round. Shipping in the round, as explained above, requires excessive refrigeration and space. The cost of this is of course passed on to the final consumer in the United States. It would therefore be desirable from this standpoint to provide an economically feasible method for holding the frozen fish so that they could be distributed as frozen products if the United States market demands the same or could be supplied to American canneries where suitable labor conditions prevail and tinplate is most economically available.

Since the slaughter period for certain meats which are canned is a relatively short period occurring in the colder fall months, it would also be desirable to provide a method which could preserve these meats in a frozen condition for future canning as the canning facilities become available or for distribution as the frozen product if the market demands the same. This is particularly true for example of Argentine beef.

A similar problem occurs in the industry concerned with the distribution of fowl either as the frozen or canned commodity although the problem may not be as great.

Accordingly, it is a principal object of the present invention to provide an improved method of processing and preserving fleshy comestibles so that they may be distributed as a frozen product or may, if desired, be subsequently canned under more favorable conditions than those surrounding the canning of comestibles in the usual manner.

It is a further object of the present invention to provide a frozen fleshy comestible product which may be shipped directly for distribution to the final consumer as a frozen product or may either be shipped to canneries at remote distances for canning or held at the local port for the area in which the fish are caught for canning when facilities become available.

These and other objects will become more apparent from the following description of this invention. The described method, for the purpose of convenience, is directed specifically to the processing of tuna fish but is equally applicable to the processing of other fish, shell fish, animal meat, or fowl.

In the usual canning operation of tuna fish, the freshly caught fish are held in the fishing vessel's hold under refrigeration, either mechanical or ice, at about $-25°$ C. until such time as the fishing vessel reaches port. The tuna are then unloaded from the fishing vessel, weighed and transported by means such as cars or conveyor belts to a refrigerated warehouse where the tuna are stored at a temperature of about $-15°$ C. awaiting processing in a local cannery. When ready to be processed, the tuna are removed from the warehouse to the cannery where the tuna are dumped into huge concrete vats filled with tap water at room temperature. They remain in the vats for about twenty-four hours or until the thawing process is completed and are then washed, decapitated and eviscerated. The resulting decapitated and eviscerated fish are placed in mesh baskets and these baskets are placed on racks which are wheeled into cookers or steam closets. Here the fish are steamed, usually at $216°$ F., the time of steaming depending on the size of fish. After this cooking operation, the fish are cooled overnight on trays which are stacked in tiers on wheeled frames. The cooled fish are then carefully cleaned and broken into pieces or loins which are in turn cleaned to acceptable standards, scraped free of dark meat and laid on wooden trays.

The tray of cleaned loins are fed through an automatic cutter equipped with set-spaced blades which cut the loins into slabs the thickness desired for various cans. This will depend somewhat on the condition of the fish, but is approximately as follows:

| Can size | Thickness of slab, inches |
|---|---|
| ¼ pound tuna | ⅞ |
| ½ pound tuna | 1⅛ |
| 1 pound tuna | 1 9/16 |

A team of experts cut the slabs of tuna loin into small pieces while inspecting for color and odor. The tuna cans are then filled by hand directly from the trays. Pieces of tuna are selected to fit well into the can, four pieces usually being used for a fancy or solid pack. For other grades, it is customary to use about three pieces of solid meat and to fill in the can to the desired weight with flakes. Some canners use a tuna grating machine for converting the smaller pieces of fish not suitable for the solid pack to proper size for grated tuna pack. Filled cans are weighed since there is a United States Government ruling on cut-out weight for tuna.

Salt is added by means of an automatic dispenser, either to the empty can or to the full can as it passes to the closing machine.

Vegetable oil is used for most packs. Usually this is cottonseed or soy bean oil. The proper amount is added to the can to meet the net weight declaration. The oil may be filled hot at 180 to 200° F. and may be added before or after the exhaust or both.

The time of exhaustion in commercial practice varies from one to four minutes, although some canners use no exhaust. After exhaustion and closure of the cans, they are washed to remove oil from the outside and then rinsed.

The canned tuna is next processed for varying amounts of time, depending on the size of the can pack, at temperatures of approximately 240 to 250° F. After processing, the cans are cooled promptly in water and are then labeled and cased.

According to the method of the present invention, the tuna are first decapitated, eviscerated, cooked, cleaned and cut in accordance with the standard canning procedure described above. Thereafter instead of packing the tuna in the usual tin can in the manner described above, the correct number and weight of cut pieces of tuna are placed in a metal saucer and the following procedure followed:

1. The filled saucers go on a belt line where another team of workers pack the tuna on each saucer into individual molds.

2. As the molds come off the belt line, they are given a filling of oil such as cottonseed or soy bean oil. Since the tuna is still in an unfrozen state and consequently soft, the oil penetrates the inside as well as coating the outside of each individual piece of tuna. The quantity of oil added must not be a quantity great enough to fill the interstices between individual pieces of tuna and should be no more than enough to thoroughly penetrate and coat the tuna. For example, ⅓–⅔ oz. of oil is sufficient for a 7 oz. tuna disk and this proportion of oil to tuna should not be exceeded. This penetrating action of the oil prior to freezing results in at least the following four distinct advantages:

a. The quality of the final product is enhanced because the oil penetration quickens and greatly improves the seasoning action after retorting.

b. The possibility of dehydration is reduced to a minimum because of the more thorough oil coating, not only around the outside of the molded tuna disk proper, but around each piece of tuna constituting the tuna disk.

c. Deformation of the tuna disk (out of roundness) during a subsequent freezing step is also reduced to a minimum because the oil has a lower coefficient of expansion than water, and its freezing does not tend to expand the spaces between the pieces of tuna to the extent as would be the case if only water were present or where a larger quantity of oil is added.

d. Scorching is prevented by the greater oil adherence around the sides, and the top and bottom of the tuna disk.

3. After this oil filling, the molds are covered with individual metal covers. By so covering, the tuna inside the mold is more evenly frozen during the following step and the molds may be placed two-deep on large metal trays to save space.

4. The trays go into a blast freezer for about 12 hours at −25° C.

5. They are then stored in a refrigerated stockroom at a temperature of −15° C.

6. When ready for packing, the trays are brought out into a special room which is kept at a cool temperature. The frozen tuna disks are taken out of the molds and dipped into oil such as cottonseed or soy bean oil. (The choice of oil in this and the prefreezing fill is determined by the oil to be used in the final fill at the canning plant.) This dipping gives a thin coating of oil which does not add appreciable weight to the hard frozen tuna disk but has the effect of a protective coating enveloping the tuna disk. The total amount of the oil added prior to freezing and the oil making up this external coating is not substantially greater than 10 percent of the total weight of the frozen tuna disk.

7. The frozen oil-dipped tuna disks are then placed end-to-end to form a cylinder or roll. Each cylinder or roll is wrapped in parchment paper, or other suitable wrapping and preferably hermetically sealed to form a frozen pack.

8. These cylinders or rolls are placed into a shipping carton, which is then bound with steel tapes and stored in a refrigerated stockroom at −15° C. until ready to be transported.

The above described process permits easy separation of the individual frozen molded portions or disks in the cylinders or rolls for sale as a frozen commodity or for subsequent canning operations without interfering with the shape and form of the individual portions. This is of importance particularly where the packaged article may be used for subsequent canning operations since it is necessary that the entire molded portion of tuna be inserted in the canning tin without any loss or gain of weight. Among the many suitable oils which may be used in the prefreezing fill and for coating the frozen tuna disks, there may be mentioned vegetable and animal oils such as hydrogenated cottonseed oil, soy bean oil, fish oils, etc.

It it becomes desirable to can the tuna packaged in the above manner, the individual portions may be separated, then placed directly in cans and usual canning practice followed in subsequent steps. The fact that the tuna arrives at the cannery as a package containing a plurality of molded tuna portions of the proper size and weight for canning and that these portions may be easily separated and deposited in cans by means which may be located above a conveyor transporting the cans ready for filling so as to drop the individual portions into the cans eliminates the necessity of handling and sorting a plurality of such portions at the cannery. This is of particular importance where labor at the place of molding and freezing is cheaper than at the place of canning. The process also produces a product for canning which is of a high and uniform quality. Thorough quality control is not possible with frozen whole tuna since the fish may be truly inspected for color and odor only after cooking.

The remainder of the canning operation after filling the cans with the frozen tuna portions simply involves adding a proper amount of oil which is compatible with the oil previously added, exhausting and closing the can, washing and rinsing, processing in the usual manner, cooling, labeling and casing. The added oil at this point is the readily controlled means for arriving at the final critical volume of the can contents.

If on the other hand, it becomes desirable because of market conditions to sell the frozen commodity, it can be shipped to the distributor which may be a modern chain store. Here there would be the choice of removing the individual portions from the cylinder or roll and repackaging for sale at self-service meat counters or distribution to the butcher who would remove portions in accordance with the customer's desires. Hotels and restaurants would find the pack suitable for their need, the pack being separated and thawed as demand arises.

The foregoing method which has been described in connection with the packaging of tuna fish is equally applicable to the packaging of other fish, shell fish, fowl or animal meat. The process of this invention as applied to any of these other comestibles would deviate from the usual canning process at the point of packing the processed comestible in the canning tin. At this stage of the operation, the comestible would instead be packed in a mold of the desired size and shape. Thereafter the molded comestible would be frozen and separated from the mold. A suitable oil, which may be, in the case of animal meat or fowl, part of the fat resulting from the cooking of the same, may be used for the prefreezing fill and for coating the molded frozen portions and these portions would then be placed in end-to-end relation to form a cylinder or roll and then wrapped in parchment paper.

The shape and size of the individual molded portions or disks of fish, shell fish, animal meat or fowl preferably is dependent upon the standardized shape and size of the can in which these respective comestibles are generally canned. It will be obvious that a molded portion may have a transverse cross sectional shape corresponding to that of the can but a longitudinal dimension equal to a whole number multiple of the depth of the can. The can filling portion would then be obtained by removing disks from the resulting molded pack, which disks would be of the proper shape to fill a can.

Selection of a mold having the shape and dimension of a selected standard size canning tin is of particular importance if it may subsequently become desirable because of market demands to can the molded tuna. Selection of such a mold size is also desirable even though the molded article will be sold as a frozen commodity since the resultant net weight of tuna has proven to be a satisfactory portion for sale to the final consumer of canned tuna and thus by custom should be equally satisfactory for the consumer of the frozen tuna.

The molds used are so designed as to permit release of the frozen disk without application of heat by any method, tamping, force, or other similar means. Since a steam blast or other quick-thawing step to free the frozen disk is eliminated, a step in the production process is saved but more important the frozen disk retains its shape and hard-frozen protective coating of frozen oil. Also, there being no need for tamping or other forceful means of release, the individual pieces of fleshy comestible constituting the frozen disk are not subject to force which would adversely affect their adherence to adjacent pieces in the disk. One suitable mold design comprises a steel band approximately 1 millimeter thick, as wide as the inside depth of the container to be used in freezing the disk, and equal in length or preferably slightly less than the circumference of the foregoing container. The container may be of dimensions identical to a standard can and is cut transversely through the sides to provide identical top and bottom halves. The steel band is bent into a circle of sufficient diameter to fit inside the container and then inserted into one half. The resulting mold is filled with the desired weight of fleshy comestible and oil, covered with the second half of the container and the contents frozen. After freezing, the second half of the container is removed and the steel band removed from the other half container. The natural tendency of the steel band to spring apart slightly will free the frozen disk allowing it to fall freely from the container. The thickness of the steel band provides the necessary tolerances so that the frozen disk will easily slip into a standard can without undue force and still leave sufficient space for the usual final fill of oil during the canning operation.

The foregoing description of this invention is for the purpose of illustration and is not limiting the scope of the invention which is set forth in the appended claims.

What is claimed is:

1. A processed fleshy comestible article useful in the canning of said fleshy comestible in a standard can comprising a disk of precooked frozen fleshy comestible, the transverse cross sectional shape and the thickness of the disk being substantially the same as the corresponding dimensions required for filling a standard can, the disk comprising a plurality of pieces of frozen fleshy comestible, a coating of frozen oil on the individual pieces of fleshy comestible comprising the disk, and a protective coating of frozen oil enveloping the disk, the total oil present being not substantially greater than ten percent of the total weight of the article.

2. A processed fleshy comestible article useful in the canning of the fleshy comestible in a standard can comprising an elongated pack of precooked frozen fleshy comestible, the transverse cross sectional shape of the frozen fleshy comestible in the pack being substantially the same as that required for filling a standard can and the total length of the frozen fleshy comestible in the pack being substantially equal to a whole number multiple of the thickness of fleshy comestible required for filling the same standard can, the pack comprising a plurality of frozen individual disks in end-to-end relation, each disk comprising a plurality of pieces of frozen fleshy comestible, a coating of frozen oil on the individual pieces of fleshy comestible comprising the disk, and a protective coating of frozen oil enveloping the disk, the total oil present being not substantially greater than ten percent of the total weight of the article.

3. A method of processing a fleshy comestible to form a frozen disk useful in the canning of said fleshy comestible in a standard can which comprises the steps of placing a plurality of pieces of fleshy comestible in a mold, adding a small quantity of oil thereto sufficient to penetrate and coat the individual pieces of fleshy comestible with oil, freezing the contents of the mold to form a frozen disk therefrom, removing the frozen disk intact from the mold, applying at least one coating of oil to the frozen disk, and then freezing the coating of oil applied to the frozen disk to form a frozen protective coating of oil over the disk, the total oil present being not substantially greater than ten percent of the total weight of the article.

4. A method of processing a fleshy comestible to form a pack useful in the canning of said fleshy comestible in a standard can which comprises the steps of: forming a precooked fleshy comestible into a plurality of frozen disks each of a size and shape necessary for filling a standard can; each frozen disk being formed by placing a plurality of pieces of precooked fleshy comestible in a mold, adding a small quantity of oil thereto sufficient to penetrate and coat the individual pieces of fleshy comestible with oil, freezing the contents of the mold to form a frozen disk therefrom, removing the frozen disk intact from the mold, applying at least one coating of oil to the frozen disk, and then freezing the coating of oil applied to the frozen disk to form a protective coating of frozen oil over the disk; placing a plurality of frozen disks in end-to-end relation to form a cylinder therefrom; and wrapping the same to form a frozen fleshy comestible pack, the total oil present being not substantially greater than ten percent of the total weight of the article.

References Cited in the file of this patent

UNITED STATES PATENTS

| | | |
|---|---|---|
| 1,864,285 | Taylor | June 21, 1932 |
| 2,630,390 | Carruthers | Mar. 3, 1953 |
| 2,763,557 | Helgerud et al. | Sept. 18, 1956 |

OTHER REFERENCES

"Food Manufacture," July 1955, pages 267 to 270, inclusive, article entitled Freezing Fish in Alginate Jelly.